United States Patent [19]

Dugdale

[11] Patent Number: 5,707,128
[45] Date of Patent: Jan. 13, 1998

[54] TARGET PROJECTOR AUTOMATED ALIGNMENT SYSTEM

[75] Inventor: Jon Dugdale, Turleson, Tex.

[73] Assignee: Hughes Electronics, Los Angeles, Calif.

[21] Appl. No.: 670,737

[22] Filed: Jun. 24, 1996

[51] Int. Cl.⁶ .................................................. G03B 21/14
[52] U.S. Cl. ............................. 353/50; 353/11; 353/122
[58] Field of Search ......................... 353/11, 122, 98, 353/50, 46, 48; 434/40, 44; 348/121, 123

[56] References Cited

U.S. PATENT DOCUMENTS

| | | | |
|---|---|---|---|
| 3,359,855 | 12/1967 | Webb | 353/48 |
| 3,729,315 | 4/1973 | Couklin et al. | 353/11 |
| 4,235,535 | 11/1980 | Prinz et al. | 353/11 |
| 4,621,371 | 11/1986 | Gotou et al. | 378/34 |
| 5,224,860 | 7/1993 | Waldman et al. | 353/11 |
| 5,274,406 | 12/1993 | Tejima et al. | 353/70 |
| 5,326,266 | 7/1994 | Fisher et al. | 353/50 |
| 5,355,188 | 10/1994 | Biles et al. | 353/69 |
| 5,455,647 | 10/1995 | Fujiwara | 353/101 |
| 5,479,224 | 12/1995 | Yasugaki et al. | 353/101 |
| 5,566,370 | 10/1996 | Young | 434/44 |

Primary Examiner—William Dowling
Attorney, Agent, or Firm—Michael W. Sales; Wanda K. Denson-Low

[57] ABSTRACT

An alignment system and method for maintaining the alignment of a target projector with another image projector in a simulator system. The target projector system includes a slewable fold mirror to move the target image in azimuth and elevation. A two position beam splitter is arranged so that in a projector operating mode, the beam splitter is positioned out of the target projector image light path, and in a projector maintenance mode, the beam splitter is positioned in the image light path. A photo-sensitive array is positioned relative to the beam splitter such that light from the display screen is redirected from the light path onto the array. During the maintenance mode, reference light points are generated on the display screen, and the target projector is precisely aligned by use of processing the images captured by the array to calculate an error signal representing the distance between the light point image and the center of the array. The error signal is used to command servo motors positioning the slewable fold mirror to precisely align the target projector to the light points. The servo commands resulting in the precise alignment for each reference point are stored in a lookup table in memory. These commands are used to obtain additional table values for interpolated points between the reference points. The table values are then used to adjust the servo motor commands positioning the slewable mirror during normal operation of the target projector.

19 Claims, 5 Drawing Sheets

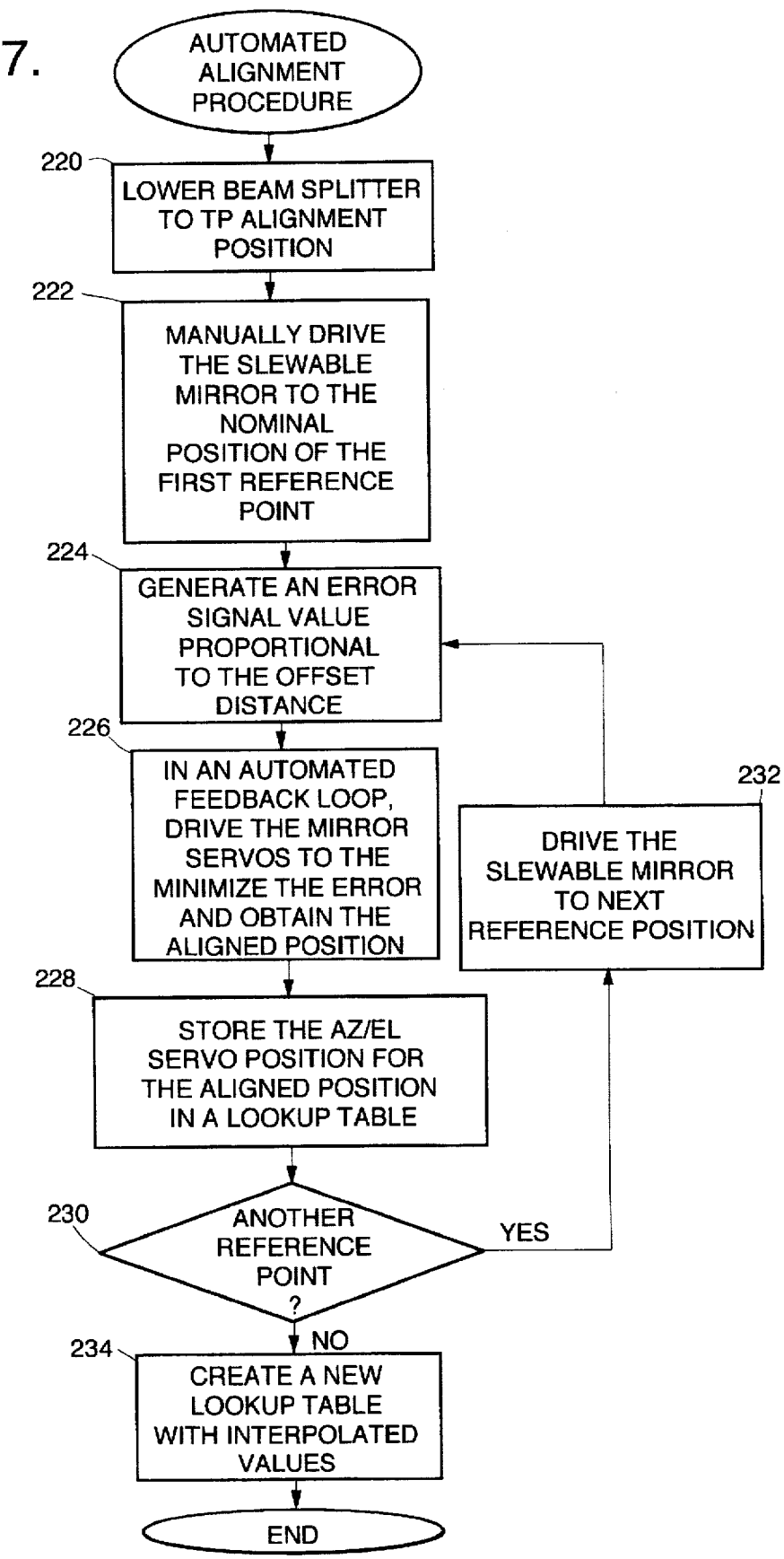

TARGET PROJECTOR AUTOMATED ALIGNMENT SYSTEM

TECHNICAL FIELD OF THE INVENTION

This invention relates to projector systems, and more particularly to target projectors and other types of devices employing slewable projected images that have to be precisely matched with simulator visual display systems and other viewable systems.

BACKGROUND OF THE INVENTION

Simulator systems are in widespread use to train pilots and other air crew member, air traffic controllers and others in many different fields. Simulator visual displays employ projectors for projecting the scene being simulated, and other types of projectors such as target projectors, area-of-interest projectors and the like which generate special purpose slewable images which have to be precisely matched with the general purpose visual display projector images. Presently, most systems are manually aligned using time consuming manual methods requiring highly trained technicians. The time and labor required for the manual alignment is expensive.

One air traffic control tower training simulator using multiple target projectors uses a technique whereby one target projector is manually aligned, and then the lookup tables for the other target projectors are updated.

It would be an advantage to provide a technique for alignment of target projectors in a simulator system that would allow more frequent, more accurate and less labor intensive alignments.

SUMMARY OF THE INVENTION

In accordance with one aspect of the invention, an alignable image projector system for projecting slewable visual images is described. The system includes a display screen, a first image projector responsive to image data signals for projecting a visual image along an image light path, and a slewable optical apparatus disposed in the light path between the image projector and the display screen for slewing the position of the projected visual image on the display screen in response to slew commands. The system further includes an apparatus for generating a reference pattern of one or more light points on the display screen during a maintenance mode, each light point at a corresponding reference position. An optical relay disposed between the image projector and the slewable optical apparatus is operable during a system maintenance mode to relay the image from the display screen to a position sensing photodetector. The photodetector apparatus senses the position of a light point in relation to a photodetector reference point and generating a sensor signal indicative of said sensed position. A control apparatus is responsive to the sensor signal during the maintenance mode to generate slew commands to slew the slewable optical apparatus so as to align said optical apparatus with one or more light points of the reference pattern. The control apparatus includes memory apparatus for storing slew command data representing alignment command data for controlling the slewable optical apparatus during a projector operating mode.

In accordance with another aspect of the invention, a method is described for aligning an image projector to a display screen, the image projector including a slewable optical apparatus disposed in the light path between the image projector and the display screen for slewing the position of the projected visual image on the display screen in response to slew commands. The method comprises the following steps:

- generating a reference pattern of one or more light points on the display screen, each light point at a corresponding reference position;
- disposing an optical relay in the light path between the image projector and the slewable optical apparatus to relay an image of a reference light point on said display screen onto a position sensing photo-detector;
- generating a photodetector sensor signal indicative of the position of one of the reference light points in relation to a detector reference point;
- issuing slew commands for slewing the optical apparatus to align the relayed image of the reference light point with each one of the detector reference points;
- storing slew command data representing the alignment of the relayed image with the detector reference points for subsequent use in a normal system operating mode.

The method in a preferred form further comprises a manual setup process comprising the steps of: generating an alignment pattern by the image generator onto the display screen; using the projected alignment pattern to slew the slewable optical apparatus to coarsely align the image projector with each of the reference light points; and for each coarse alignment of the image projector with a reference light point, storing slew command data representing the position of the slewable optical apparatus at each coarse alignment position.

BRIEF DESCRIPTION OF THE DRAWING

These and other features and advantages of the present invention will become more apparent from the following detailed description of an exemplary embodiment thereof, as illustrated in the accompanying drawings, in which:

FIG. 7 is a process flow diagram illustrating an automated alignment procedure in accordance with the invention.

DETAILED DESCRIPTION OF THE PREFERRED EMBODIMENT

Figure 1:
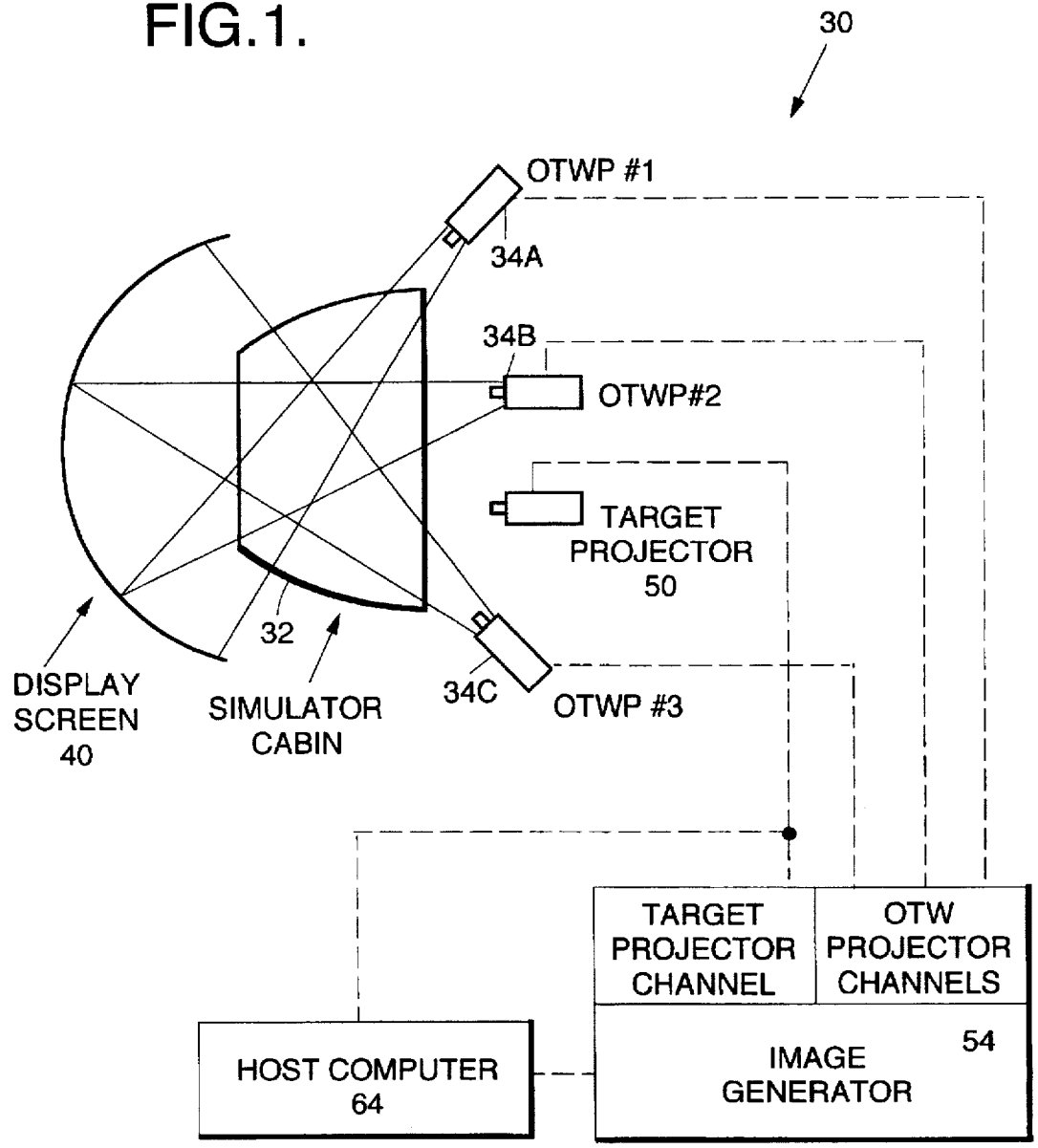
FIG. 1 is a block diagram illustrating a simulator visual display system employing the invention.

The preferred embodiment of this invention is for use in a simulator visual display system 30, illustrated in block diagram form in FIG. 1. The system 30 includes elements arranged about a simulator cabin 32, including a display screen 40, three out-the-window projectors (OTWPs) 34A–34C and a target projector (TP) 50. A host computer 64 controls the operation of the display projectors and the image generator 54. The image generator includes a target projector channel and OTW projector channels, and generates image data defining the images to be projected by the TP 50 and the OTWPs 34A–34C.

Figure 2:
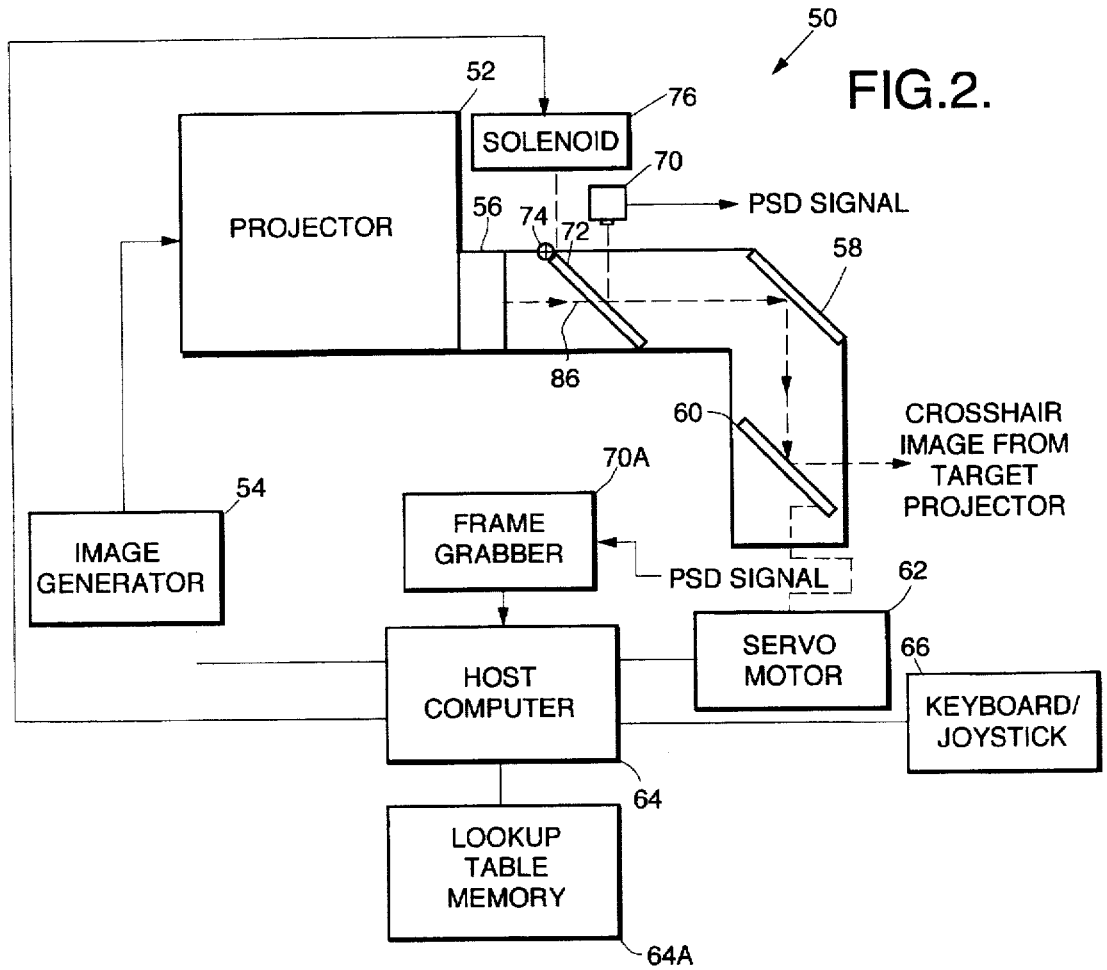
FIG. 2 is a side schematic diagram of a target projector system used in the visual simulator display system of FIG. 1 and employing the invention.

The target projector (TP) 50 system comprising the simulator visual display system 30 is illustrated in further detail in FIG. 2. The system 50 includes the projector 52 which projects the target image supplied by target image data from the image generator 54. A lens system 56 performs the zoom and focus functions necessary for the target image to appear the proper size. A stationary fold mirror 58 folds the target image down 90 degrees. A slewable fold mirror 60 is driven by servo motors 62 to move the target image in azimuth (AZ) and in elevation (EL). The servo motors 62 are driven by position signals from a visual or host computer 64 during normal operation. During maintenance operation, the servo motors 62 are driven by an operator using a joystick or keyboard 66.

To the extent just described, the target projector system 50 is of conventional design. In accordance with the invention, the system 50 further includes a position sensing photodetector (PSD) 70 which senses the position of a light point. In a preferred implementation, the PSD 70 includes a charge-coupled-array (CCD) device, which captures successive two-dimensional images of the scene within its field of view. A frame grabber 70A is responsive to the image data, i.e. the PSD signal, to provide successive frames of the images captured by the PSD. A two position beam splitter 72 (shown in the alignment mode position in FIG. 1) relays the image from the display screen 40 to the PSD 70. When the system is not in the alignment or maintenance mode, the beam splitter 72 is rotated upward about pivot 74 by a solenoid 76 operated under control of the host computer 64, out of the target projector light path, to the position illustrated in FIG. 3.

Figure 4:
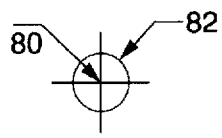
FIG. 4 illustrates the crosshair and nominal circle projected by the target projector of FIG. 1 onto the display screen during a maintenance mode.

During use of the target projector in a maintenance mode, the target projector 52 projects a crosshair 80 and nominal circle 82, as illustrated in FIG. 4, onto the display screen 40. The two position beam splitter 74 is lowered into the down position shown in FIG. 2. When there is a light point in the field-of-view (FOV) of the PSD 70, the beam splitter 74 relays the image of the light point onto the PSD 70. The PSD signal is processed through the frame grabber, and the resulting image frame is processed, e.g. by the host computer 64, to determine the location of the light point in relation to the center of the PSD device. A data value or signal is developed from the result of the image processing that is proportional to the distance between the center of the PSD and the image point being displayed on the PSD by the beam splitter 74. This distance value or signal is used to generate an error signal that repositions the servo driven slewable fold mirror 60 in AZ and EL until the light point is centered on the PSD 70, and thus also is centered relative to the target projector center axis 86. By processing successive frames of the image presented to the PSD in different positions of the slewable mirror, determining the resulting position of the light point in relation to the PSD center, and repositioning the slewable mirror, the mirror can be moved to the aligned position wherein the reference light point is centered on the PSD. Since the PSD center will have previously been aligned to the center of the target light path, the alignment is effected for this particular reference light point position.

Figure 5:
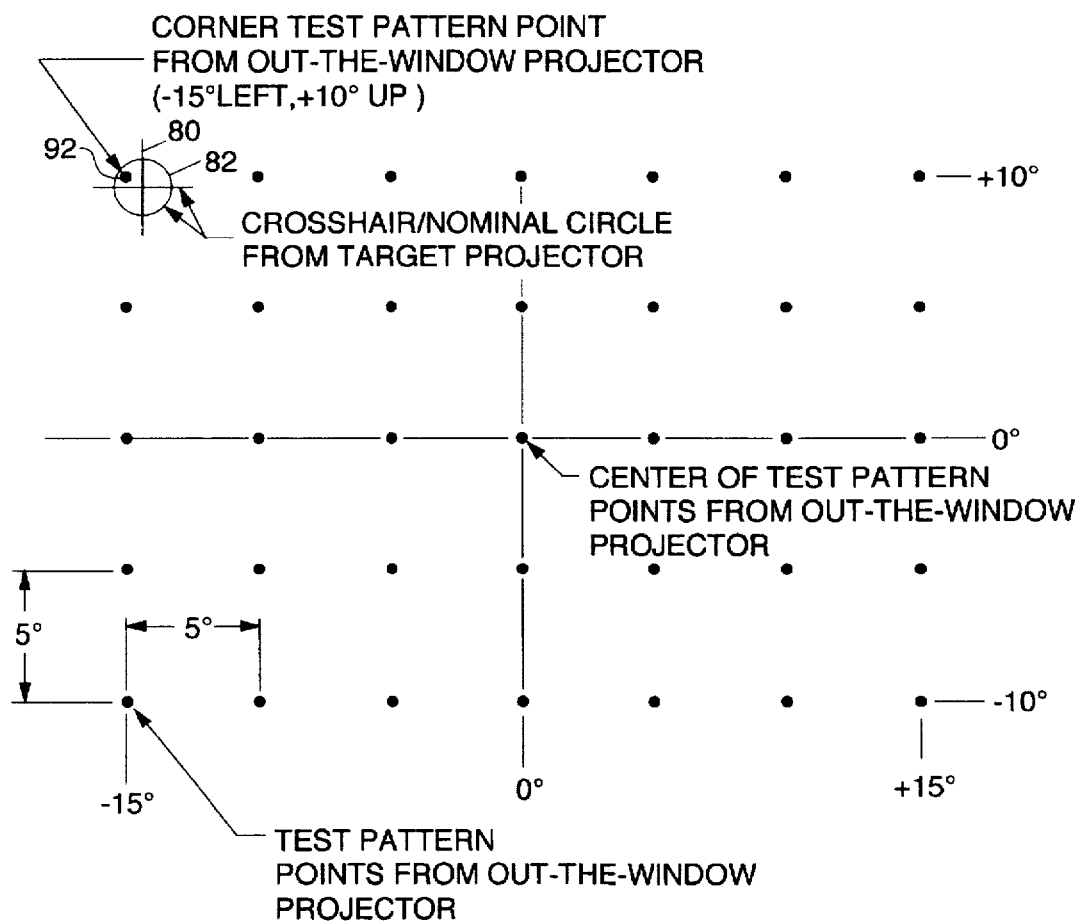
FIG. 5 illustrates an exemplary 5 degree test pattern used to align a visual image with a display screen.
Figure 6:
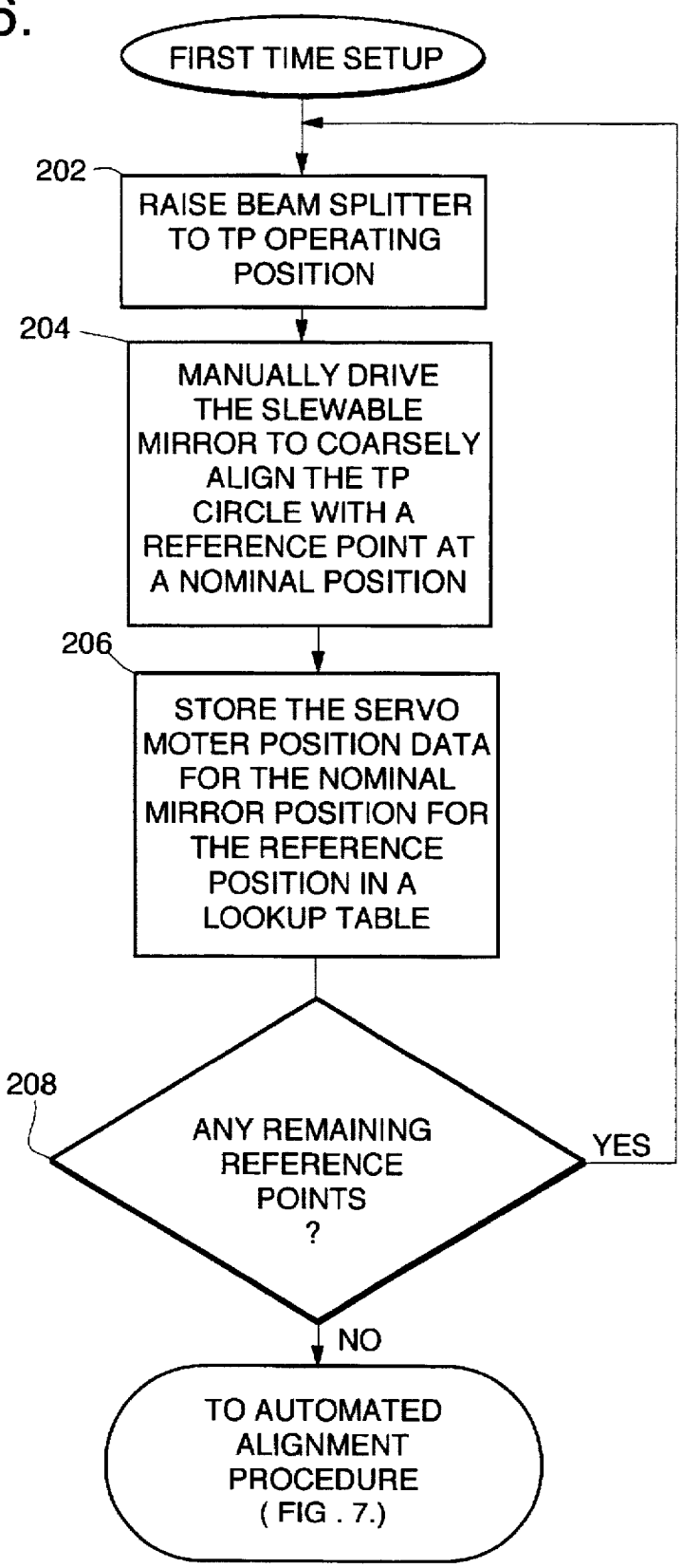
FIG. 6 is a process flow diagram illustrating a first time setup procedure employed in the alignment of the target projector.

FIG. 5 shows a typical 5 degree test pattern that is used in accordance with the invention to align a visual image with a display screen. From the center of the exemplary pattern shown, the points cover from +15 degrees to −15 degrees in AZ and from +10 degrees to −10 degrees in EL. The points are displayed every 5 degrees either by an OTWP 34A–34C, or by fiber optic points embedded in the screen, or by some other method. The crosshair 80 and nominal circle 82 shown in the upper left corner of FIG. 5 are projected by the target projector 52 and overlay the corner test pattern point 92 projected by the OTWP at −15 degrees left, +10 degrees up.

Figure 3:
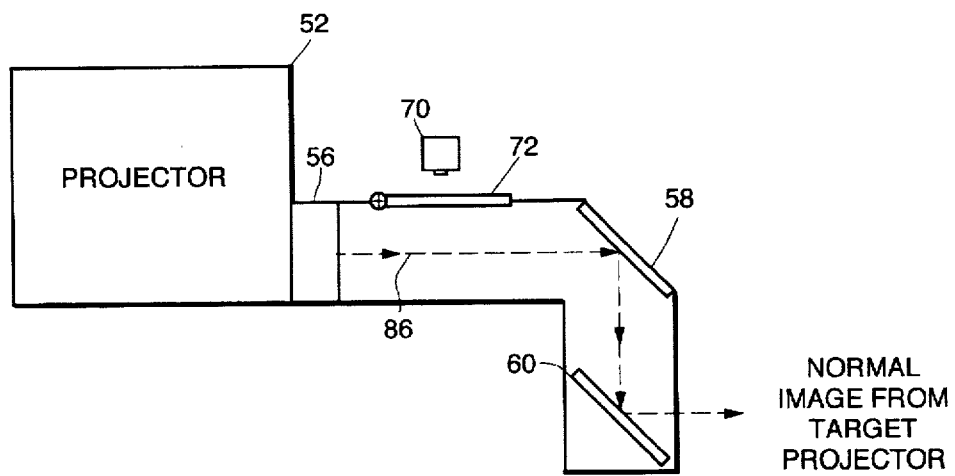
FIG. 3 shows the target projector of FIG. 2 with the two position beam splitter used in the alignment process rotated upward out of the target projector light path.

During a first time setup procedure illustrated in FIG. 5, and during normal operation, the two position beam splitter 72 is raised to the TP operating position (illustrated in FIG. 3). Referring now to FIG. 5, the first time setup procedure starts with the step (202) of raising the beam splitter 72 to the TP operating position. The maintenance operator manually drives the AZ and EL of the slewable fold mirror 60 with the joystick or keyboard 66 so that the top left reference point 92 displayed by the OTWP falls anywhere within the nominal circle displayed by the TP 52 (step 204). (These nominal points will be more exactly aligned during the automated alignment procedure illustrated in FIG. 7.) This position of the mirror 60 is then identified to the computer 64 as the −15 degree AZ, +10 degree EL point on the display screen. The computer stores the servo motor commands corresponding to this mirror position in a lookup table in memory 64A (FIG. 2) for later use during the automated portion of the set up procedure (step 206). The purpose of this coarse alignment is to find a position of the slewable mirror which will position the particular reference point with the field of view of the PSD 70. The remaining reference points displayed by the OTWP are then manually processed in the same manner (steps 208, 202–206). As the TP nominal circle 82 is overlayed on each OTWP reference point, the operator enters the "nominal" AZ and EL for each point until all the locations for all the nominal points are entered into the computer lookup table stored in memory 64A (FIG. 2). After all "nominal" points have been entered, the command is entered for the system 50 to begin the automated portion of the alignment process illustrated in FIG. 7.

During the automated alignment process of FIG. 7, the two position beam splitter 72 is lowered (step 220) to the TP alignment position shown in FIG. 2, and the following steps are performed.

1. At step 222, the operator is directed to drive the AZ and EL of the slewable fold mirror 60 so that the top left reference point 92 displayed by the OTWP falls anywhere within the nominal circle 82 displayed by the TP. Typically, the operator receives this instruction by text commands on a computer monitor comprising the host computer. The operator drives the fold mirror using the keyboard or joystick 66, and then signals to the computer 64 that this command has been met by use of the keyboard, say by pressing the "enter" key. As an alternative to the operator manually driving the slewable mirror, the host computer can use the nominal location determined during the initial setup process, providing the OTWP has not drifted in its alignment sufficiently since the last alignment to have moved the reference point location out of the field of view of the PSD. In this event, even the initial pointing of the slewable mirror is automated, and under the control of the host computer.

2. Since the TP nominal circle 82 is not exactly centered over the OTWP light point 92, the PSD 70, the frame grabber 70A, and host computer 64 generates an error signal value proportional to the offset distance (step 224).

3. Using this error signal, the computer 64, which has been programmed with software to implement the automated portion of the alignment process, drives the slewable fold mirror servo motors 66 to position the mirror 60 such that the TP target crosshair 80 is precisely aligned over the OTWP light point (step 226). The image processing performed by the computer 64 to align the target projector to the reference light point does not require that the crosshair 80 be projected, provided the center or other reference point on the PSD has been aligned relative to the target light path. However, if such alignment of the PSD to the target light path has not occurred, then the image processing can calculate the position of the center of the target crosshair relative to the reference light point, and use this position to command the servo motors 62 to move the mirror 60, until alignment has been achieved. The AZ and EL servo position for this new precise location is then stored in a new lookup table in the memory 64A of computer 64 (step 228).

4. The computer 66 then successively drives the slewable fold mirror 60 to each of the other, "nominal" points stored in the lookup table created during the first time setup procedure (steps 230 and 232). For each nominal point, the PSD receives an image of the display screen within its field of view, and generates an error signal value proportional to the offset distance between the center of the crosshair and the light point, or the distance between the center of the PSD array and the light point image, is calculated. The computer 64 uses this error signal to drive the slewable fold mirror 60 to precisely align the TP target crosshair over the OTWP light point (step 226). The AZ and EL servo positions for these new precise locations are also stored in the new lookup table (step 228).

5. After exact servo positions corresponding to all OTWP reference light points have been entered into memory, the computer 64 creates an additional lookup table based on the geometry of the display system and the offset position of the TP for interpolation of values between the OTWP reference points (step 234). This table is used during the normal operating mode to accurately position target images projected by the target projector.

6. The automated alignment procedure of steps 1–5 above is repeated at time intervals, e.g. once or twice per week, to allow for any normal drift of the display system OTWPs. The automated alignment procedure is also repeated each time after the OTWPs are aligned to maintain alignment of the TP 50 with the OTWPs.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An alignable image projector system for projecting slewable visual images, comprising:

a display screen;

a first image projector responsive to image data signals for projecting a visual target image along a target image light path;

a slewable optical apparatus disposed in the light path between the image projector and the display screen for slewing the position of the projected visual image on the display screen in response to slew commands;

apparatus for generating a reference pattern of one or more light points on the display screen, each light point at a corresponding reference position;

a position sensor apparatus for sensing the position of a light point in relation to a sensor reference point and generating a sensor signal indicative of said sensed position;

an optical relay operable during a system maintenance mode to relay the image from the display screen to the position sensor apparatus; and control apparatus responsive to the sensor signal during the maintenance mode to generate said slew commands to position said slewable optical apparatus so as to align said optical apparatus with said one or more light points of said reference pattern, said control apparatus including memory apparatus for storing slew command data representing alignment command data for controlling said slewable optical apparatus during a projector operating mode.

2. The system of claim 1 wherein the slewable optical apparatus comprises a slewable fold mirror and positioning apparatus for slewing the position of the fold mirror in response to the slew commands.

3. The system of claim 2 wherein the positioning apparatus comprises servo motor apparatus.

4. The system of claim 1 wherein the slewable optical apparatus comprises apparatus for slewing said position of said target image in azimuth and in elevation.

5. The system of claim 1 wherein said optical relay comprises a beam splitter selectively positionable in said target light path during said maintenance mode to relay said display screen image to said position sensing apparatus.

6. The system of claim 5 wherein the optical relay includes relay positioning apparatus responsive to relay position commands for positioning the beam splitter in the target light path at an alignment position during the maintenance mode, and for positioning the beam splitter out of the target light path at a projector operating position during the normal operating mode of the projector.

7. The system of claim 1 further including an image generator for generating said image data signals, said image generator providing image data signals for producing an alignment image during said maintenance mode for coarse alignment of said target projector with a reference light point.

8. The system of claim 7 wherein said alignment image includes a crosshair and a nominal circle.

9. The system of claim 1 wherein said sensor signal is proportional to the distance between a center of said position sensor apparatus and the image of the reference light point relayed to said position sensor apparatus, and wherein said control apparatus includes a feedback loop apparatus operable during the maintenance mode for moving said slewable optical apparatus to reposition the slewable optical apparatus until the reference light point image is centered on said center of said position sensing apparatus.

10. The system of claim 1 wherein said apparatus for generating said reference light pattern comprises a fiber optic array.

11. The system of claim 1 wherein said apparatus for generating said reference light pattern comprises a second image projector for projecting a pattern of light points onto said display screen.

12. The system of claim 11 wherein said first projector is a target projector comprising a visual display simulator system.

13. The system of claim 12 wherein said second projector is an out-of-the-window projector comprising the simulator system.

14. The system of claim 1 wherein said position sensing apparatus comprises a two-dimensional photosensitive array device for capturing a two-dimensional image of a scene within an array device field of view.

15. A method for aligning an image projector to a display screen, the image projector including a slewable optical apparatus disposed in the light path between the image projector and the display screen for slewing the position of the projected visual image on the display screen in response to slew commands, the method comprising the following steps:

generating a reference pattern of one or more light points on the display screen, each light point at a corresponding reference position;

disposing an optical relay in the light path between the image projector and the slewable optical apparatus to relay an image of a reference light point on said display screen onto a position sensor apparatus;

generating a sensor signal indicative of the position of one of the reference light points in relation to a sensor reference point;

issuing slew commands for slewing the optical apparatus to align the relayed image of the reference light point with each one of the detector reference points;

storing slew command data representing the alignment of the relayed image with the detector reference points for subsequent use in a normal system operating mode.

16. The method of claim 15 further comprising a manual setup process comprising the steps of:

generating an alignment pattern by the image generator onto the display screen;

using the projected alignment pattern to slew the slewable optical apparatus to coarsely align the image projector with each of the reference light points; and for each coarse alignment of the image projector with a reference light point, storing slew command data representing the position of the slewable optical apparatus at each coarse alignment position.

17. The method of claim 16 further comprising the step of using said slew command data representing the position of the slewable optical apparatus at each coarse alignment position to pre-position said slewable optical apparatus prior to said step of issuing slew commands to align said sensor reference point with said relayed image of said reference light point.

18. The method of claim 15 wherein said slew command data is stored in a lookup table in a memory.

19. The method of claim 15 further comprising the step of using said lookup table data to generate an interpolated lookup table including slew command data for positions intermediate said reference light positions.

* * * * *